Patented Nov. 14, 1950

2,530,262

UNITED STATES PATENT OFFICE 2,530,262

EXTRUSION APPARATUS

Oscar G. Nelson, Baltimore, Md., assignor to Western Electric Company, Incorporated, New York, N. Y., a corporation of New York Application December 15, 1947, Serial No. 791,867

6 Claims. (Cl. 18—12)

This invention relates to extrusion apparatus, and has for an object thereof the provision of new and improved extrusion apparatus.

In the use of extrusion apparatus of the type including an extrusion cylinder having an extrusion screw therein and an extrusion head which is detachable from the extrusion cylinder, it is often necessary to detach the extrusion head from the extrusion cylinder so that the extrusion cylinder and the extrusion head may be cleaned out. In the past, there has been no apparatus for quickly engaging and disengaging an extrusion head with respect to an extrusion cylinder.

An apparatus illustrating certain features of the invention includes an extrusion cylinder, an extrusion head designed to engage the extrusion cylinder and toggle-joint linkage means for locking the extrusion head in engagement with the extrusion cylinder.

A complete understanding of the invention may be obtained from the following detailed description of an apparatus illustrative of the invention when read in conjunction with the appended drawings, in which.

Figure 1:
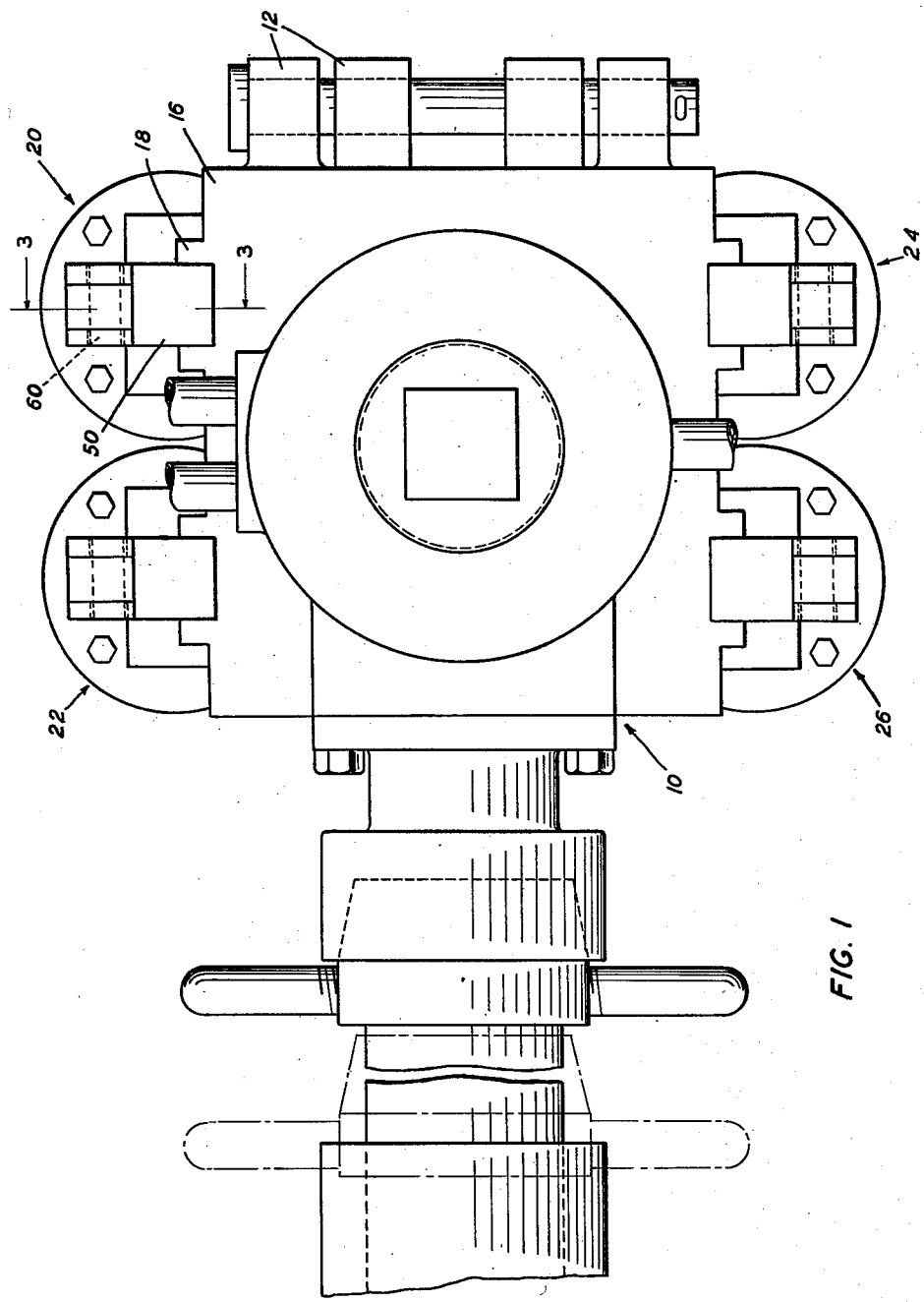
Fig. 1 is a fragmentary, front elevation of an extrusion apparatus illustrating certain features of the invention.

Referring now in detail to the drawings, an extrusion head 10 (Fig. 2) is secured by a loose hinge 12 to an extrusion cylinder 14. The head 10 may be pivoted into engagement with the extrusion cylinder 14 and may be pivoted to a position away from the extrusion cylinder 14, as illustrated by the broken-line position of the extrusion head 10 in Fig. 2. The extrusion head 10 includes a body member 16 having lugs 18—18 projecting therefrom. Locking devices 20, 22, 24 and 26 are designed to engage the lugs 18—18 to hold the extrusion head 10 in pressure-tight relationship with respect to the extrusion cylinder 14. Since all these devices are identical in construction and operation, only the locking device 20 will be described in detail.

The locking device 20 (Figs. 3 and 4) includes a cylinder 30 fixed to the extrusion cylinder 14. A pipe 32 leads to the right end of the cylinder 30, as viewed in Fig. 3, and a pipe 34 leads to the left end thereof. A piston 36 mounted slidably in the cylinder 30 is connected by a piston rod 38 to a clevis 40. A packing gland 42 seals the left end of the cylinder, and a compression spring 44 seated between the packing gland 42 and a spring seat 46, which is slidable in a guideway 48, urges the clevis 40 to the left. This, when the clevis 40 is in the position shown in Fig. 3, holds a camming lug 50 in locking engagement with the lug 18 through a toggle-joint linkage including the lug 50, which is mounted on a pin 52.

The pin 52 is mounted in a fixed bracket 54, and a fork 56 formed integrally with the lug 50 is pivotally mounted on a pin 60. A link 58 connected to the pin 60 and a pin 62 secured to the clevis 40 connect the fork 56 to the piston rod 38. The compression spring 44 is strong enough to hold the toggle-joint linkage formed by the link 58, the fork 56 and the lug 50 in such a position that it tends to hold the extrusion head 10 in pressure-tight relationship with respect to the extrusion cylinder 14. The actions of the springs of the locking devices 22, 24 and 26 corresponding to the compression spring 44 serves to hold those locking devices in similar positions, and the conjoint action of all the locking devices hold the head in place.

Operation

Figure 3:
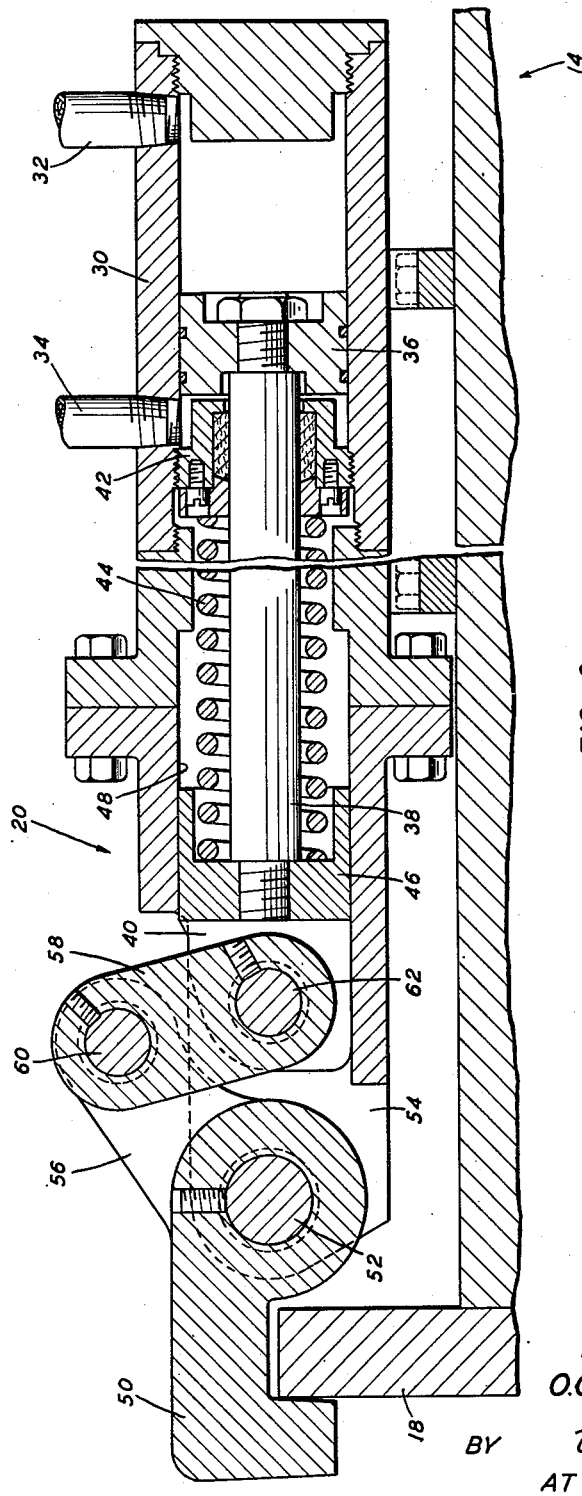
Fig. 3 is an enlarged, vertical section taken along line 3—3 of Fig. 1.
Figure 4:
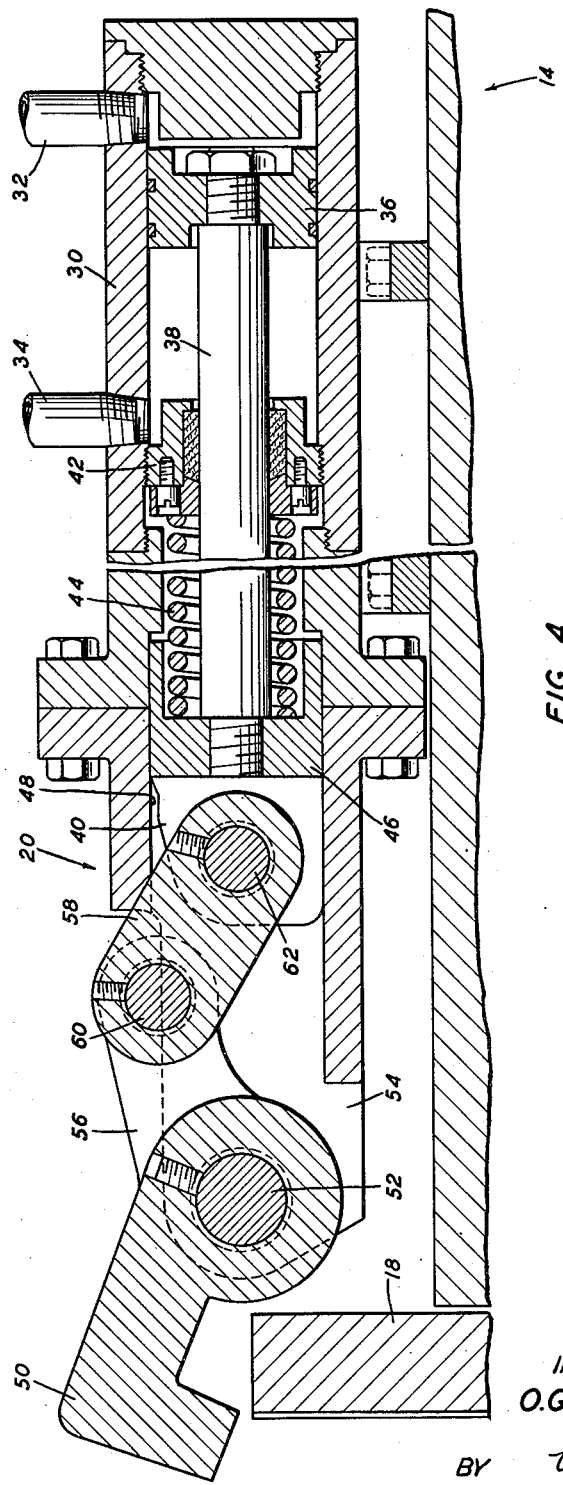
Fig. 4 is a view similar to Fig. 3 but with certain elements of the apparatus in positions different from those in which they are shown in Fig. 3.

When it is desired to open the extrusion head 10 with respect to the extrusion cylinder 14, a suitable fluid, such as air or a liquid, is introduced under pressure into the left end of the cylinder 30, as viewed in Fig. 3, through the pipe 34, and any fluid present in the right end of the cylinder 30 is exhausted through the pipe 32. Simultaneously the locking devices 22, 24 and 26 are actuated similarly. The fluid under pressure forces the piston 36, the piston rod 38 and the clevis 40 to the right against the actions of the compression spring 44, and moves the camming lug 50 from the position in which it is shown in Fig. 3 to the position in which it is shown in Fig. 4. The other locking devices 22, 24 and 26 are unlocked simultaneously and the extrusion head 10 then may be swung away from the extrusion cylinder 14 to provide access to the extrusion cylinder and the back side of the extrusion head.

Figure 2:
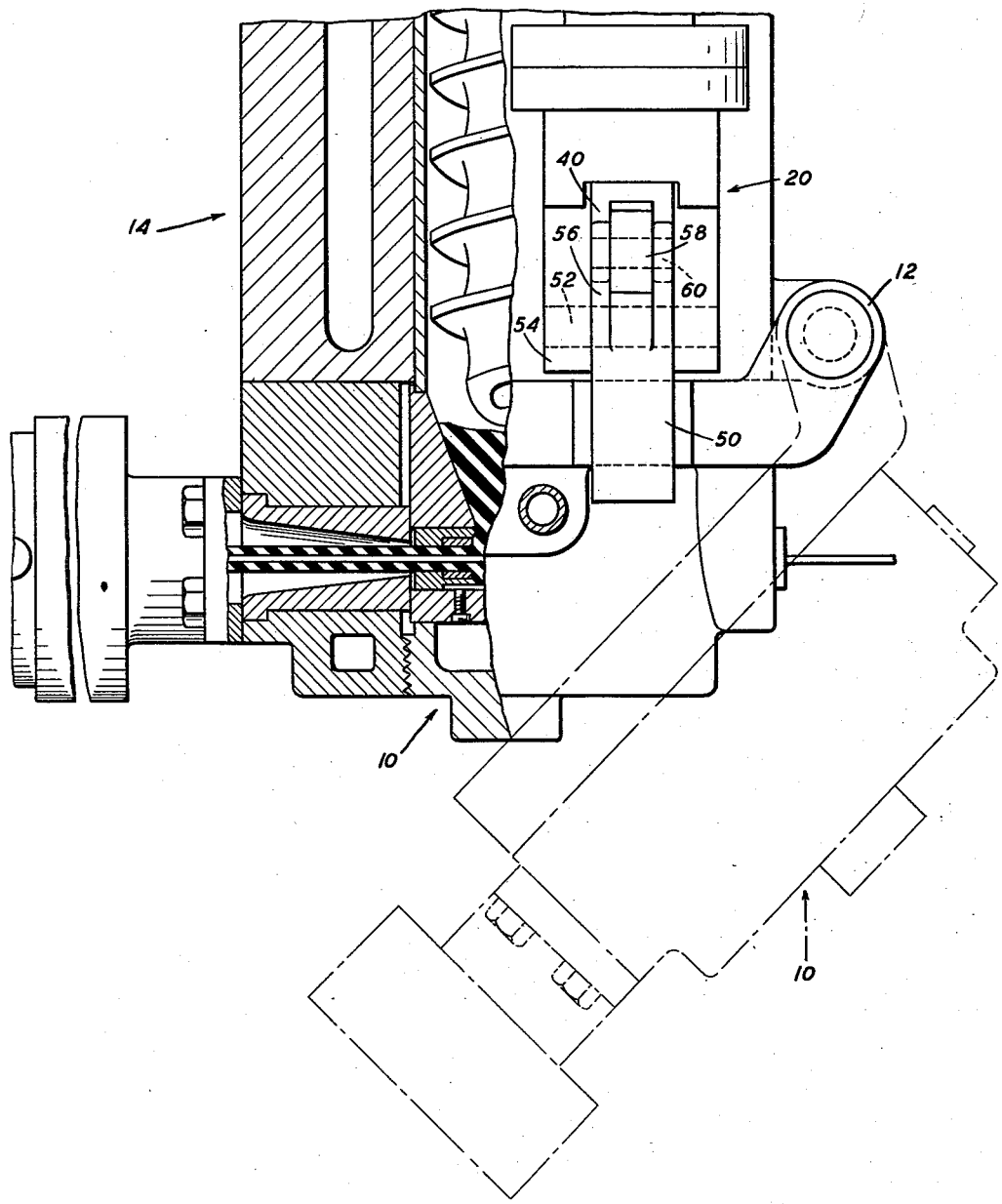
Fig. 2 is a fragmentary, partially sectional, top plan view of the apparatus.

To lock the extrusion head 10 in pressure-tight engagement with the extrusion cylinder 14, the extrusion head 10 is swung to its closed line position, as viewed in Fig. 2. The left-hand end of the cylinder 30 is exhausted, and a suitable fluid, such as air or a hydraulic liquid, is introduced under pressure into the right-hand end of the cylinder 30 through the pipe 32 to actuate the locking device 20. The locking devices 22, 24 and 26 are actuated in a similar manner, whereupon all the locking devices press the extrusion head 10 tightly against the extrusion cylinder 14. The locking force of the fluid supplied to the locking devices is augmented by the force of the compression spring 44 and the springs corresponding thereto. Even if the pressure on the fluid in the cylinders were reduced to zero, the compression springs are sufficiently strong to maintain the extrusion head 10 in pressure-tight engagement with the extrusion cylinder 14.

The above-described apparatus serves to quickly lock and unlock the extrusion head 10 to and from the extrusion cylinder 14, and serves to hold the extrusion head in locked engagement with the extrusion cylinder even if the pressure in the fluid system fails.

What is claimed is:

1. An extrusion apparatus, which comprises an extrusion cylinder, an extrusion head mounted for movement into and out of engagement with the extrusion cylinder, means for locking the extrusion head into engagement with the cylinder, fluid pressure means for actuating the locking means, and means supplementing the fluid pressure means for holding the locking means in locking engagement with the extrusion head in case of failure of the fluid pressure means.

2. An extrusion apparatus, which comprises an extrusion cylinder, an extrusion head movable into and out of engagement with the extrusion cylinder, means for locking the extrusion head in engagement with the extrusion cylinder, means for actuating the locking means, and means for holding the locking means in operative condition in case of failure of the actuating means.

3. An extrusion apparatus, which comprises an extrusion cylinder, an extrusion head movable into and out of engagement with the extrusion cylinder, latching means for holding the extrusion head in engagement with the extrusion cylinder, a toggle-joint linkage for actuating the latching means, spring means operative through the toggle-joint linkage for maintaining the latching means normally in a position in which it holds the extrusion head in engagement with the extrusion cylinder, and means operative through the toggle-joint linkage for moving the latching means against the action of the spring means to unlatch the extrusion head.

4. An extrusion apparatus, which comprises an extrusion cylinder, an extrusion head movable into and out of engagement with the extrusion cylinder, a guideway mounted on the cylinder, a latch pivotally mounted on the cylinder, a clevis mounted slidably on the guideway, a toggle-joint linkage connecting the latch to the clevis, means for urging the toggle-joint linkage in a direction in which the latch is moved into engagement with the extrusion head, and means for moving the clevis against the action of the linkage-urging means.

5. An extrusion apparatus, which comprises an extrusion cylinder, an extrusion head movable into and out of engagement with the extrusion cylinder, a guideway mounted on the extrusion cylinder, a latch pivotally mounted on the extrusion cylinder, a clevis mounted slidably on the guideway, a toggle-joint linkage connecting the latch to the clevis, a piston connected to the clevis, a fluid pressure cylinder fixed to the extrusion cylinder, means for introducing fluid under pressure into the fluid pressure cylinder to urge through the piston the toggle-joint linkage in a direction in which the latch is moved into engagement with the extrusion head, and means for urging the clevis in said direction.

6. An extrusion apparatus, which comprises an extrusion cylinder, an extrusion head movable into and out of engagement with the extrusion cylinder, a plurality of latches pivotally mounted on the cylinder for engaging the head, fluid pressure means mounted on the cylinder, and toggle-joint linkage means for connecting the latches to the fluid pressure means.

OSCAR G. NELSON.

REFERENCES CITED

The following references are of record in the file of this patent:

UNITED STATES PATENTS

| Number | Name | Date |
|---|---|---|
| 1,947,202 | Homeier | Feb. 13, 1934 |
| 2,061,407 | Royle | Nov. 17, 1936 |
| 2,449,625 | Stuart, 2d | Sept. 21, 1948 |